United States Patent [19]
Spencer-Smith

[11] Patent Number: 6,044,696
[45] Date of Patent: Apr. 4, 2000

[54] APPARATUS FOR TESTING AND EVALUATING THE PERFORMANCE OF AN AUTOMOBILE

[75] Inventor: Michael Spencer-Smith, Napa, Calif.

[73] Assignee: Northern California Diagnostic Laboratories, Napa, Calif.

[21] Appl. No.: 08/833,862

[22] Filed: Apr. 10, 1997

[51] Int. Cl.[7] .......................... G01L 3/00; G01M 17/00
[52] U.S. Cl. ............................................................. 73/117
[58] Field of Search ................................. 73/117, 865.6, 73/117.2, 117.3, 116

[56] References Cited

U.S. PATENT DOCUMENTS

| | | | |
|---|---|---|---|
| 3,690,165 | 9/1972 | Sturmo et al. | 73/117 |
| 3,832,894 | 9/1974 | Pelta | 73/117 |
| 3,926,043 | 12/1975 | Marshall et al. | 73/117 |
| 4,161,116 | 7/1979 | Fegraus et al. | 73/117 |
| 4,186,593 | 2/1980 | Watanabe | 73/117 |
| 4,385,518 | 5/1983 | Rickett . | |
| 4,455,866 | 6/1984 | Barrigar | 73/117 |
| 4,825,690 | 5/1989 | Mears | 73/117 |
| 5,000,038 | 3/1991 | Katt | 73/117 |
| 5,101,660 | 4/1992 | La Belle | 73/117 |
| 5,111,685 | 5/1992 | Langer | 73/117 |
| 5,154,076 | 10/1992 | Wilson et al. | 73/117 |
| 5,154,077 | 10/1992 | Fujimori | 73/117 |
| 5,275,565 | 1/1994 | Moncrief | 434/29 |
| 5,323,644 | 6/1994 | Schaefer | 73/117 |
| 5,375,460 | 12/1994 | La Belle | 73/117 |
| 5,375,461 | 12/1994 | Suzuki | 73/117 |
| 5,385,042 | 1/1995 | La Belle | 73/117 |
| 5,396,792 | 3/1995 | Kohsaka et al. | 73/117 |
| 5,450,748 | 9/1995 | Evans et al. | 73/117 |
| 5,861,552 | 1/1999 | Clayton, Jr. et al. | 73/117 |

*Primary Examiner*—George Dombroske
*Attorney, Agent, or Firm*—Thomas R. Lampe

[57] ABSTRACT

Apparatus for testing and evaluating the performance of an automobile under simulated conditions includes torque applicators for connection to wheel shafts of an automobile and for applying torque forces to the wheel shafts, movable supports supporting the torque applicators and a force applicator for connection to the automobile to apply forces to the automobile. A control associated with the torque applicators and the force applicator varies the torque forces applied by the torque applicators to the wheel shafts and varies the forces applied to the automobile by the force applicator.

23 Claims, 6 Drawing Sheets

APPARATUS FOR TESTING AND EVALUATING THE PERFORMANCE OF AN AUTOMOBILE

TECHNICAL FIELD

This invention relates to apparatus for testing and evaluating the performance of an automobile under simulated conditions. The invention is applicable, for example, to test and evaluate the performance of race cars and predetermining how the race cars will perform under simulated conditions of specific race tracks. Employment of the apparatus enables race teams to perform an accurate diagnosis of a car's performance, functioning as a diagnostic tool for set-up and alignment of race cars for a specific track under "race day" conditions.

BACKGROUND OF THE INVENTION

The invention disclosed and claimed herein incorporates a dynamometer which is utilized in conjunction with other system components to facilitate tuning of an automobile's operational characteristics and components for specific simulated conditions, such as those found at a particular race track.

Dynamometers per se are well known and are employed in conjunction with automobiles primarily for the purpose of testing the automobiles under load to obtain emissions data. Engines themselves have been positioned on dynamometers for other types of testing purposes and then installed on the automobile chassis.

A search of the prior art located the following United States patents disclosing dynamometers and related equipment believed to exemplify the present state of the prior art in the automotive testing field:

U.S. Pat. No. 5,396,792, issued Mar. 14, 1995, U.S. Pat. No. 5,111,685, issued May 12, 1992, U.S. Pat. No. 4,455,866, issued Jun. 26, 1984, U.S. Pat. No. 5,385,042, issued Jan. 31, 1995, U.S. Pat. No. 5,275,565, issued Jan. 4, 1994, U.S. Pat. No. 5,101,660, issued Apr. 7, 1992, U.S. Pat. No. 4,186,593, issued Feb. 5, 1980, U.S. Pat. No. 5,375,460, issued Dec. 27, 1994, U.S. Pat. No. 5,154,076, issued Oct. 13, 1992, U.S. Pat. No. 5,000,038, issued Mar. 19, 1991, U.S. Pat. No. 3,690,165, issued Sep. 12, 1972, U.S. Pat. No. 5,375,461, issued Dec. 27, 1994, U.S. Pat. No. 5,154,077, issued Oct. 13, 1992, U.S. Pat. No. 4,825,690, issue May 2, 1989, U.S. Pat. No. 4,161,116, issued Jul. 17, 1979, U.S. Pat. No. 5,323,644, issued Jun. 28, 1994.

None of the patents teach or suggest the combination of structural elements employed in the system disclosed and claimed herein for testing and evaluating the performance of an automobile under simulated conditions.

Throughout the world race teams have only one goal: Win the race. Literally billions of dollars are spent annually in the pursuit of speed on the race track. Modern race cars are extremely expensive. Top Indycar teams, for example, commonly spend more than five million dollars to campaign a one car effort over a nine month season.

Stakes are high in the field of automobile racing and teams constantly strive to improve the efficiency and performance of their vehicles. Millions of dollars are spent annually in research, testing and design. The cost for practice sessions and travel can easily consume between one-quarter and one-half of a team's annual budget.

The apparatus of the present invention has as one of its major objectives assisting race teams to become more successful while developing faster race cars. Much research is carried out "on the track", an expensive and sometimes risky practice. Furthermore, the only feasible way for race teams to actually test their vehicles for performance on a particular track has been to drive the track during practice sessions. Such an approach is a major expense but, up to now, has been considered a necessary part of a winning racing team's overall program.

Utilizing the apparatus disclosed and claimed herein teams can save both time and money when testing and refining the structure of the race car. Furthermore, through utilization of the apparatus there is significantly lower risk of vehicle loss as well as a significant increase in driver track awareness.

The apparatus incorporates a central processing unit programmed to simulate real-time track conditions for a particular track. This will significantly improve a race team's position prior to arriving at the track on or just before race day. By employing the apparatus, race teams can focus their full attention on chassis set-up and the particular engine parameters of the day, i.e., temperature, humidity and surface conditions, instead of worrying about basic engine functions and such matters as whether or not a new ignition system is reliable enough to last through the period of the race.

No known devices comparable to that disclosed and claimed herein are known. Current development is essentially limited to engine testing and set-up on an engine dynamometer. The engine is then installed into the racing chassis at the team's headquarters or at the track. Track time must then be secured, team members assembled, and the equipment shipped to a specific circuit to work out any problems. The apparatus of the present invention is portable and allows for real-time diagnostics of engine, chassis, and drive train performance while not putting the vehicle and driver at risk.

DISCLOSURE OF INVENTION

The present invention relates to apparatus for testing and evaluating the performance of an automobile including a frame and wheel shafts under simulated conditions.

The apparatus includes torque applicator means for connection to wheel shafts of an automobile and for applying torque forces to the wheel shafts.

Movable support means supports the torque applicator means.

Force applicator means is provided for connection to the automobile to apply forces to the automobile.

Control means is operatively associated with the torque applicator means and with the force applicator means for selectively varying the torque forces applied by the torque applicator means to the wheel shafts and for varying the forces applied to the automobile by the force applicator means. Sensing means is employed to sense automobile performance under test.

The invention additionally encompasses environment modifying means for changing environmental conditions during test.

Utilizing the teachings of the present invention, the vehicle under test can be piloted by a "driver" who can visually perceive a display of a particular race track, e.g., a virtual reality visor may be employed for such purpose as the "driver" "drives" the track as seen. A central processing unit employed in the apparatus and suitably programmed feeds interactive commands to structure supporting the vehicle at the same time the host computer or central processing unit receives data from the vehicle, providing the ultimate tuning of man and machine and providing for the maximum preparation of driver and vehicle for a race.

Other features, advantages, and objects of the present invention will become apparent with reference to the following description and accompanying drawings.

BEST MODE FOR CARRYING OUT THE INVENTION

Figure 1:
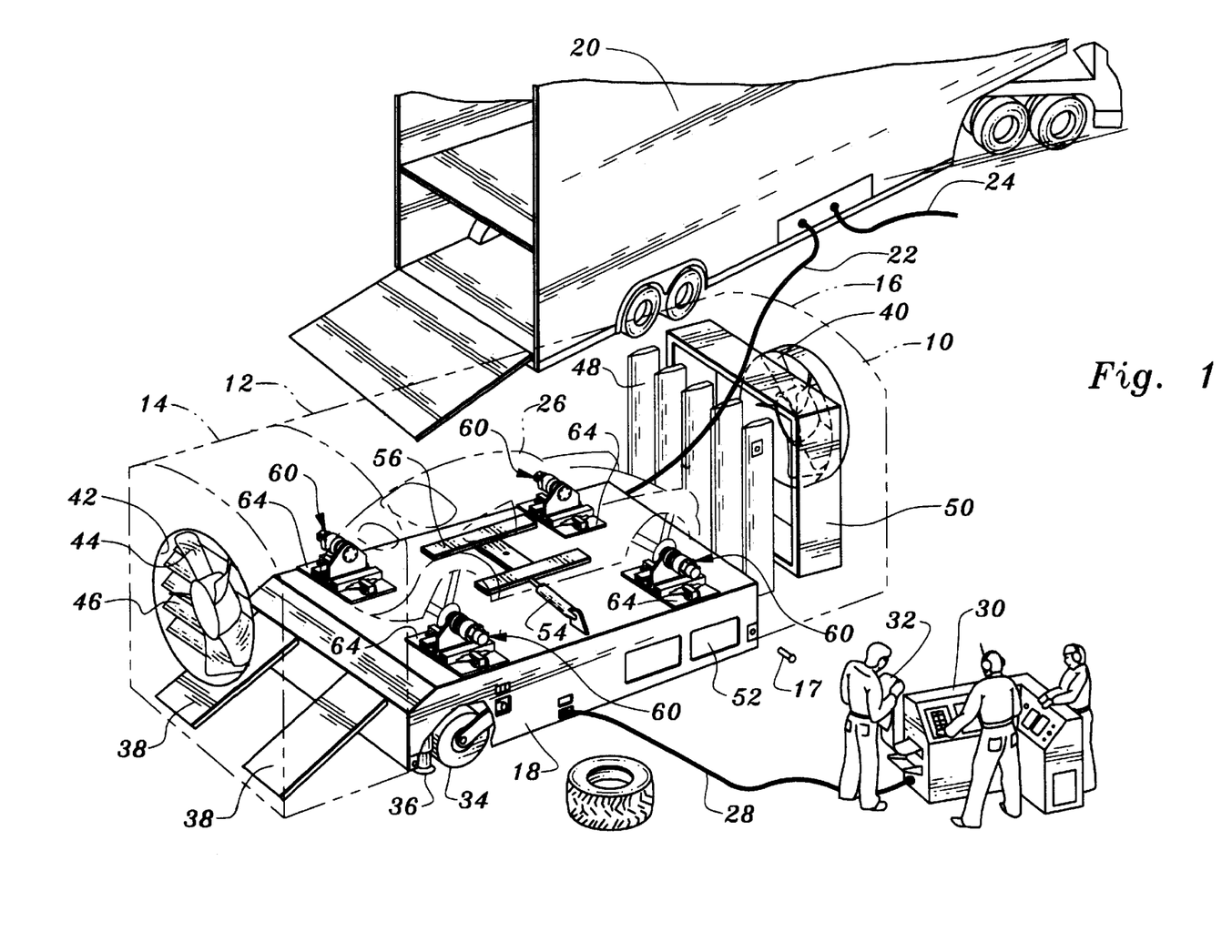
FIG. 1 is a perspective view illustrating apparatus constructed in accordance with the teachings of the present invention being utilized to test an automobile, the automobile being illustrated by dash lines.

Referring now to the drawings, FIG. 1 thereof illustrates apparatus constructed in accordance with the teachings of the present invention. The apparatus includes a portable housing 10 defining a housing interior. The housing includes a central module 12 and end housing modules 14, 16 which may be secured by any desired mechanical expedient to the ends of the central housing module such as by means of lock bolts, one of which, lock bolt 17, is shown. The bottom of the central housing module is in the form of a mobile dynamometer platform 18.

A truck trailer 20 is employed to transport the structural components of the apparatus from place to place. The truck trailer illustrated has two levels. One of the levels may have sufficient head room to allow people to stand up and can contain general shop equipment as well as one or more offices. The truck trailer preferably accommodates an on-board electrical generating system, complete with air compressor, freon compressor and a hydraulic pumping system. Since such components are known, they have not been illustrated. However, lead lines 22, 24 connected to such systems in the truck trailer are illustrated in FIG. 1. Line 22 is an umbilical that brings compressed air, electricity, refrigerant and hydraulic oil to the dynamometer system of the invention which will be described in greater detail below.

An automobile 26 is shown by dash lines in position on the dyno platform 18 for testing and evaluating the performance thereof under simulated conditions. Of course, the automobile 26 includes a frame and wheel shafts in the form of axles or spindles as is conventional.

Connected to dyno platform 18 via an umbilical 28 is a control center 30 including a central processing unit suitably programmed to control the dynamometer and related components of the apparatus in a manner to be described in more detail below as well as to receive information from such components through sensors in operative association therewith. Control center 30 also provides a real-time display of the activities of the automobile along with the command/event points from the host computer. In the arrangement illustrated, such display is provided by a continuous strip-type chart recorder generating a strip 32 of data. A monitor also provides a display.

In the arrangement illustrated, the platform 18 includes retractable wheels such as wheel 34 which may be associated with independent drive means to give the platform additional mobility. A mechanical jack 36 allows the platform to be jacked into a level orientation and provides a stable foundation for the operation thereof. Telescoping ramps 38 are associated with the dyno platform to facilitate positioning of an automobile on the platform. Casters (not shown) may be associated with the end housing modules 14, 16 to facilitate positioning thereof in association with the central housing module.

End housing module 16 includes a forced draft fan 40 which, under control of control center 30, provides variable air flow through the housing interior and out of an opening 42 in end housing module 14. End housing module 14 itself accommodates a variable pitch fan 44 controlled by the computer of control center 30 that can be sped up to overdrive forced draft fan 40 to create lower pressures in the housing interior, such as the automobile would experience at higher altitudes or on a low barometric pressure day. An air flow control louver 46 is associated with fan 44 and controls the rate at which air is exhausted from the housing interior. Louver 46 provides for the possibility of raising pressures in the chamber or housing interior to simulate, for example, the conditions that would be at sea-level, e.g., on a day with high barometric pressure.

A vane assembly 48 is provided in association with forced draft fan 40 to provide an undisturbed linear air flow from the fan 40 into the housing interior.

Located in end housing module 16 downstream from fan 40 is a heat exchanger 50, which may be of any suitable known type, that is associated with the control center 30 to provide hot or cold air on demand as well as provide a water mist to simulate various climatic conditions.

The apparatus preferably incorporates a heat exchanger 52 in the dyno platform 18 for cooling the engine of the automobile under test as well as dissipating heat from hydraulic resistance employed to put load on the automobile's drive train. A fan or other means may be provided within the platform for pulling cool air through heat exchangers to maintain the inner workings of the platform cool.

Mounted on the upper or working deck of the platform 18 is a hydraulic cylinder 54 which is controlled by the computer of control center 30. The cylinder 54 is connected to a bracket or structural member 56 which is connected to the frame of automobile 26. Preferably, the hydraulic cylinder is placed at the center of mass of the automobile. The hydraulic cylinder is employed to impart forces to the frame of the vehicle simulating the centripetal forces imparted on the frame were the automobile going through a turn in reality.

Also mounted on the work deck of the platform 18 is structure for applying torque forces to the wheel shafts of automobile 26. Such structure provides four dynamometer power take-off points in the arrangement illustrated, the apparatus in its disclosed form being suitable for testing or evaluating either a two-wheel or four-wheel drive vehicle. The four torque applicator assemblies 60 illustrated are of identical construction and in the interest of simplicity only one thereof will be described in detail, making reference not only to FIG. 1 but also to FIGS. 2 and 3.

Each torque applicator assembly includes a base plate 64 which is located on the work deck of the platform 18. The base plates may be adjustable relative to the platform to accommodate varying attachment point dimensions on various vehicles. The upper surface of baseplate 64 is planar and maintained in a horizontal plane. A hydraulically operated piston 66 is located below the baseplate to move it up or down as desired, as indicated by the double headed arrow in FIG. 3.

Figure 2:
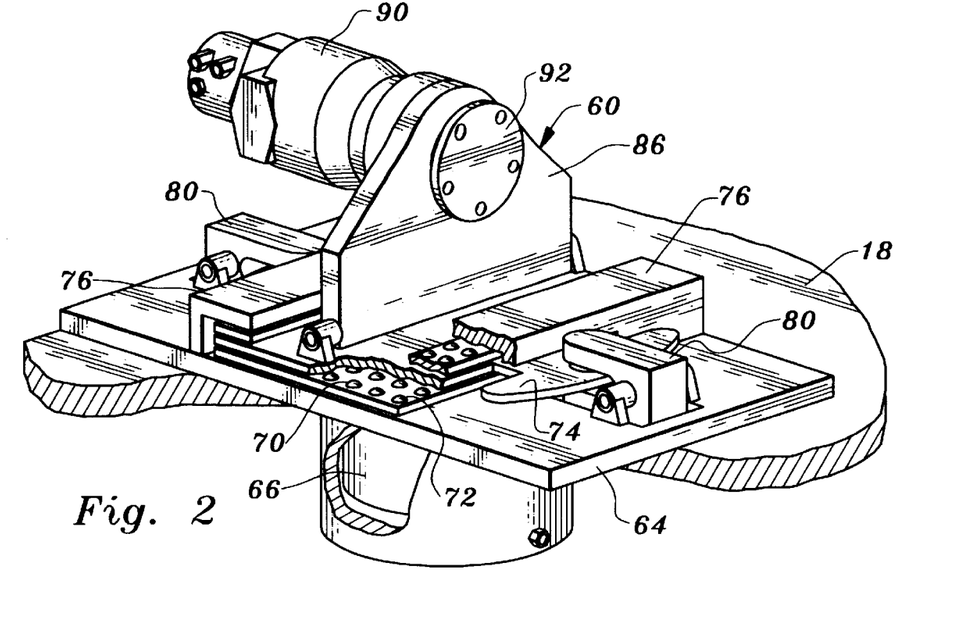
FIG. 2 is a perspective view of selected structural components of the apparatus with parts thereof broken away.
Figure 3:
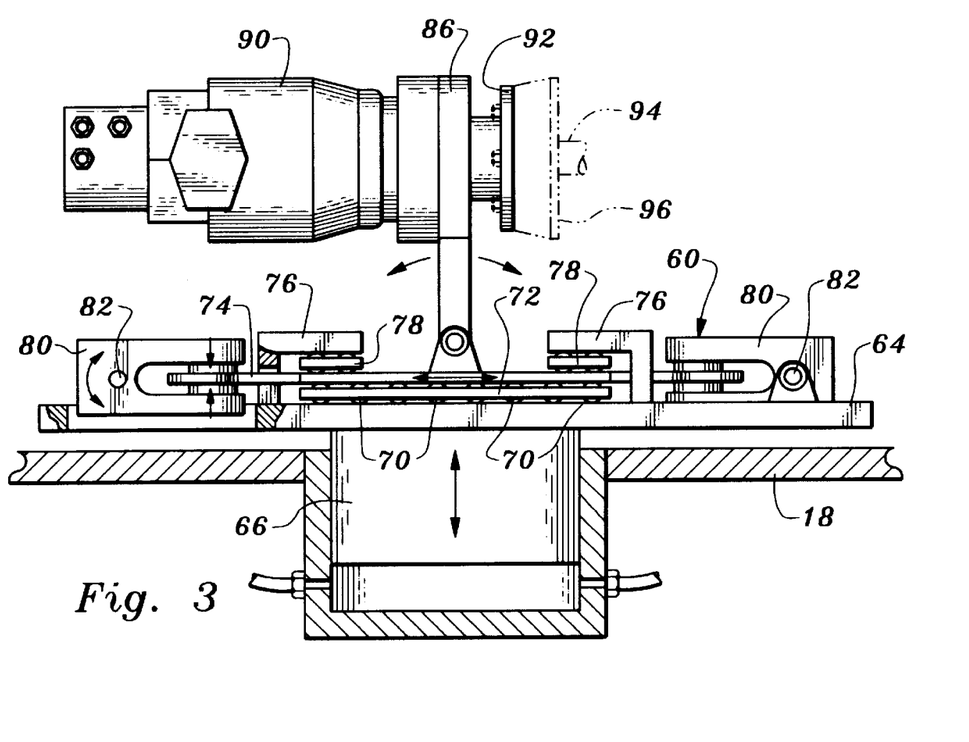
FIG. 3 is a side view of the selected components shown in FIG. 2 in partial cross-section and illustrating in schematic fashion cooperative relationships thereof.

Ball bearings 70 confined in a race 72 engage the upper surface of the baseplate. Supported on the top of the ball bearings is a support plate 74 which has a planar lower surface disposed in a horizontal plane. The plate-like support member 74 is free to move in the horizontal plane occupied thereby relative to the baseplate. Brackets 76 project upwardly from baseplate 64 and over ball bearing-race assemblies 78 disposed between support member 74 and the brackets.

As indicated above, the plate-like support member 74 is normally free to move in a horizontal plane; however, the apparatus incorporates mechanism for capturing the support member and locking it against movement when desired. More particularly, motion arresting calipers 80 attached to baseplate 64 receive opposed ends of support member 74. The calipers are pivotally attached to the baseplate by pivot pins 82 so that the calipers do not impart anything but pure clamping force to support member 74. The motion arresting calipers are similar to conventional disc brake calipers in that they each utilize two opposed friction discs to clamp onto plate-like support member 74. The motion arresting calipers may be hydraulically actuated.

The support member 74 "floats" freely in the plane of the working deck of the dynamometer platform 18 and moves as forces through the frame of the automobile under test are imparted to it.

The purpose of this feature is to monitor how the frame of the vehicle grows or warps or moves as more and more power is transmitted from the power plant through the drive train and out to the power take-off points of the apparatus. This is of vital interest when trying to tune the suspension for a particular power curve. The floating support member 74, when unclamped by the motion arresting calipers, will have a couple of inches of translational freedom in all directions from its midpoint. This motion will be measured by suitable sensors and fed back to the computerized control center 30 for analysis. Measurement of these displacements can be translated into information that can be used to change the shape of structural members inside the vehicle frame.

Pivotally mounted on support member 74 is a second support member 86. This second support member 86, which in the disclosed embodiment is in the form of a plate, is for supporting additional structure of the apparatus as well a wheel shaft of the vehicle under test. The second support member extends upwardly from support member 74 and the ability thereof to pivot provides an indication of the change in camber angle of the particular axle or spindle of the vehicle. Preferably, the mounting plate or second support member 86 is instrumented in some suitable fashion employing known sensors to show the camber angle and the change of camber angle presented by second support member 86.

Mounted on second support member 86 and projecting therefrom is a torque applicator in the form of a hydraulic motor 90 for selectively applying either negative torque forces or positive torque forces to the wheel shaft associated therewith.

The rotating component or rotor (not shown) of the hydraulic motor passes through an opening (not shown) formed in support member 86 and is secured to a power take-off interface adaptor or connector 92 which bolts onto the same interface that a vehicle wheel would. This is the component through which power is actually transmitted to simulate the power being transmitted to the ground. FIG. 3 illustrates in dash lines the wheel shaft 94 and hub 96 of an automobile secured to connector 92. It will be appreciated that the torque applicator assemblies thus provide support for the automobile under test at all four wheel locations in the disclosed embodiment. It is desired to employ dimensions in the system which allow the vehicle, when attached to the four power take-off points, will experience the same geometries as it would when sitting with its own tires on the pavement.

The hydraulic motors 90 not only consume energy transmitted or put out by the wheel shafts of the vehicle but also have the ability to input power to the wheel shafts to simulate a vehicle that is coasting in an engine "on" condition in gear (using the engine as a brake). This is accomplished and controlled by the central processing unit of the control center 30 suitably programmed for such purpose.

It will be seen from the above that a system is provided for simulating not only road or track configurations and conditions but also for changing the atmospheric or climatic environment within the housing interior. Up and down and horizontal movements of the torque applicator are readily effected to simulate specific track surfaces. Movement of the torque applicator by piston 66, for example, simulates the vehicle going over small bumps in the pavement. The ability of the torque applicator itself to apply either negative torque forces or positive torque forces allows one to simulate all load conditions as applied to the vehicle drive train.

It is thus possible to program operation of the device to simulate a specific track under virtually any climatic condition. The role of the apparatus as an evaluation tool is enhanced and the apparatus rendered even more useful by incorporating in the system visual display means for displaying a road or race track that is visually perceivable by an individual in the automobile. This could readily be accomplished by providing the "driver" piloting the car under test with a virtual reality visor that will display a track of choice, for example. As the driver "drives" the track as seen, the host computer will feed interactive commands to the dyno platform and related structure, simulating all of the track conditions.

At the same time, data is inputted from the vehicle and from the apparatus. Suitable sensors of known construction would be employed for such purpose, depending upon the nature of the information to be sensed and relayed to the central processing unit. Suffice it to say, it is desirable to monitor all degrees of freedom of the apparatus and feed such information back to the computer system.

Figures 4, 4A:
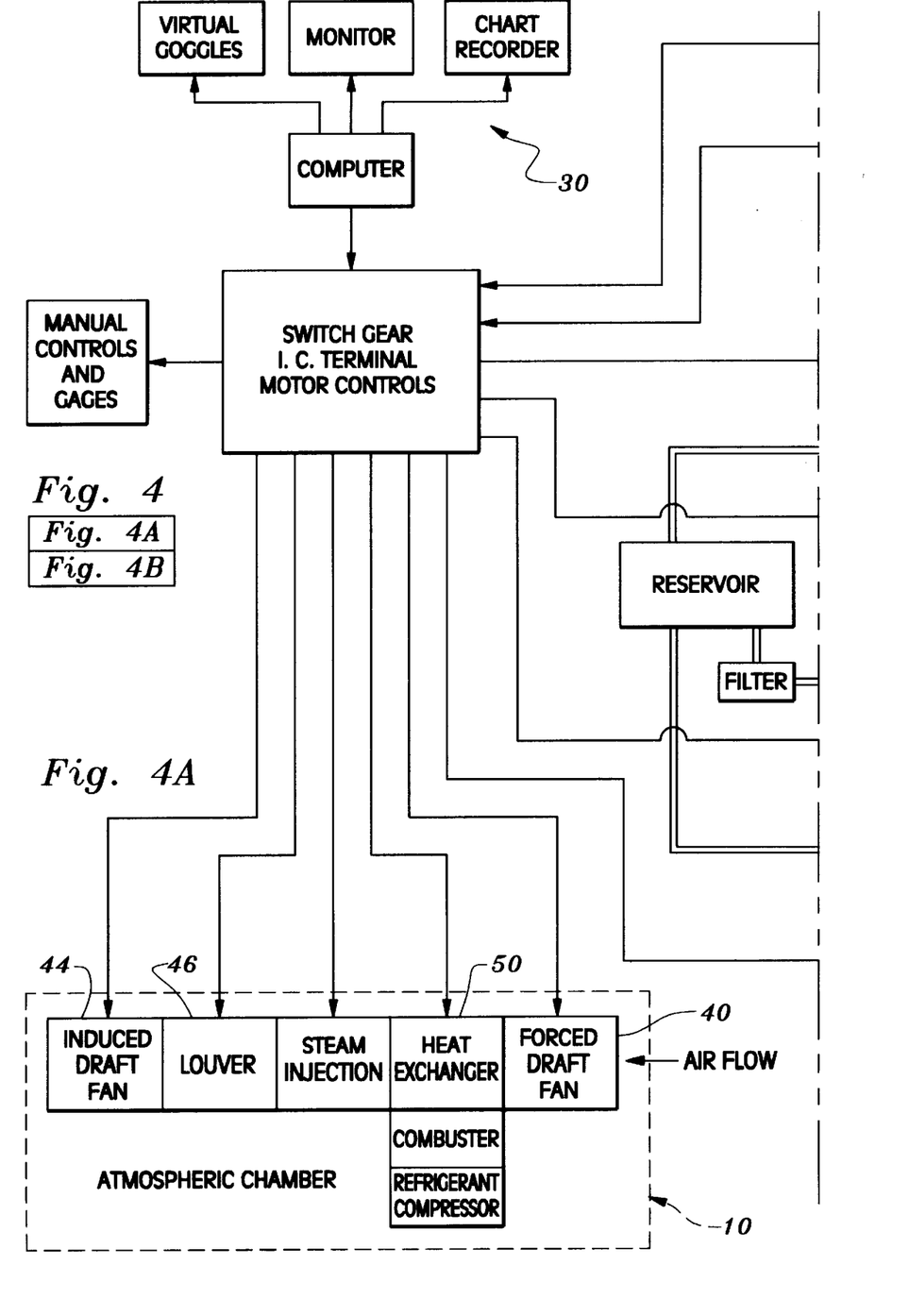
FIGS. 4A and 4B together form a block diagram of control instrumentation employed in the apparatus.
Figure 4B:
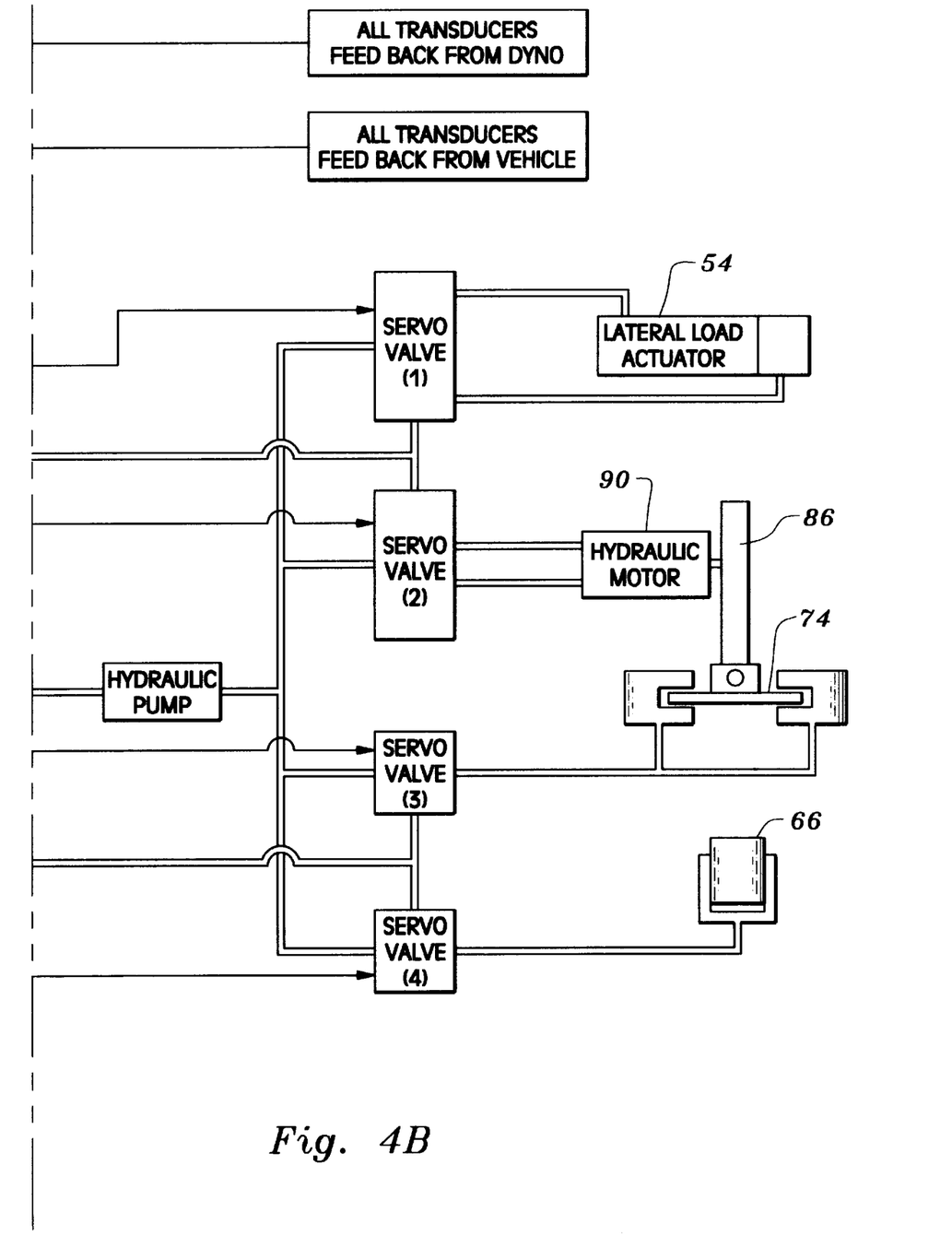
Figure 5A:
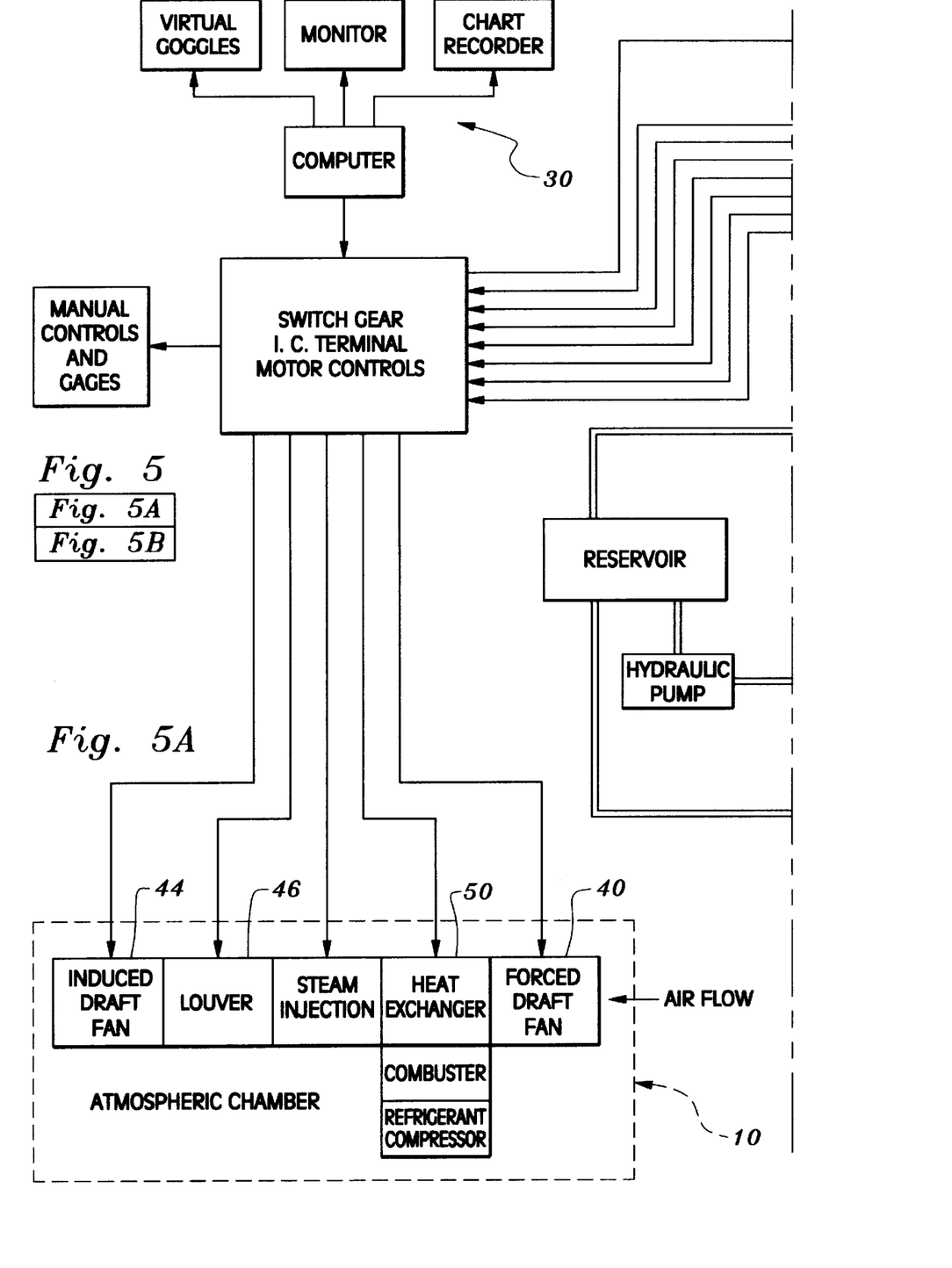
FIGS. 5A and 5B together form a block diagram of the apparatus hydraulic system.
Figure 5B:
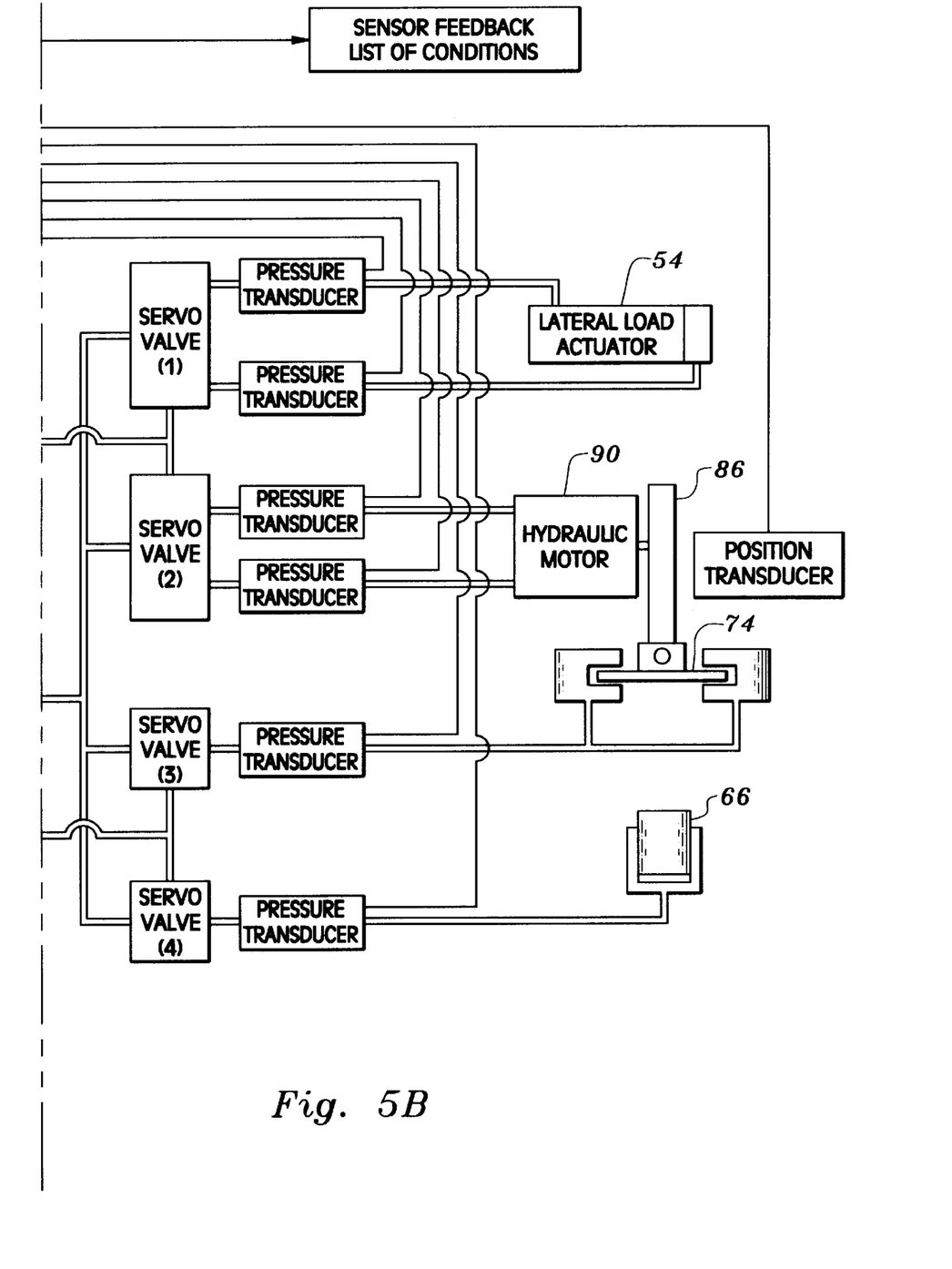

FIGS. 4 and 5 respectively disclose block diagrams of suitable control instrumentation and a representative hydraulic system which could be utilized to practice the teachings of the present invention. It will be appreciated that other suitable arrangements could be employed. In addition, the apparatus of the present invention could be modified or supplemented to provide other features. For example, a fire suppression system could be integrated into the apparatus. At the first sign of fire, the inlet and exhaust openings of the air-flow system could be automatically closed and the housing interior purged with halon or other fire extinguishing substance. Furthermore, the apparatus could be supplemented to handle the engine cooling requirements of the vehicle under test, by-passing the vehicle's cooling system and feeding coolant directly through the heat exchangers incorporated in the platform 18. This would eliminate the possibility of vehicle over-heat due to slow air movement.

What is claimed is:

1. Apparatus for testing and evaluating the performance of an automobile including a frame and wheel shafts under simulated conditions with the automobile not being supported by tires, said apparatus comprising, in combination:

torque applicator means for attachment to wheel shafts of an automobile to support the automobile by said wheel shafts when attached thereto and independently apply torque forces to said wheel shafts;

movable support means supporting said torque applicator means;

force applicator means for connection to said automobile at a location on said automobile spaced from said wheel shafts to apply forces to the automobile at said location;

control means operatively associated with said torque applicator means and with said force applicator means for selectively varying the torque forces applied by said torque applicator means to the wheel shafts when attached thereto and for varying the forces applied to said automobile at said location by said force applicator, said torque applicator means comprising a plurality of torque applicators for attachment to the wheel shafts controlled by said control means, and said movable support means comprising a plurality of movable supports, each of said movable supports supporting a torque applicator and independently movable relative to the other of said movable supports; and mover means operatively associated with said independently movable supports to move said movable supports up and down independently of one another during testing and evaluation of said automobile to simulate road or race track surface conditions.

2. The apparatus according to claim 1 additionally comprising sensor means for sensing automobile performance under test.

3. The apparatus according to claim 1 wherein said torque applicators comprise hydraulic motors for selectively applying either negative torque forces or positive torque forces to said wheel shafts.

4. The apparatus according to claim 1 wherein each of said movable supports includes a first support member movable in a generally horizontal plane.

5. The apparatus according to claim 4 wherein each of said movable supports additionally includes a second support member connected to the first support member thereof, movable with respect to the first support member thereof, and extending upwardly from the first support member thereof, each of said second support members having a torque applicator attached thereto and supported thereby for receiving an end of a wheel shaft of said automobile.

6. The apparatus according to claim 5 wherein each second support member is pivotally connected to the first support member associated therewith.

7. The apparatus according to claim 4 additionally comprising base means disposed under said first support members.

8. The apparatus according to claim 7 wherein said base means comprises a plurality of base members and wherein bearing means is disposed between each base member and an associated first support member, said bearing means facilitating movement of said first support members in a generally horizontal plane.

9. The apparatus according to claim 8 wherein each said base member has a substantially planar top base surface and wherein each first support member has a substantially planar bottom support surface parallel to the substantially planar top base surface of the base member associated therewith, said bearing means including ball bearings disposed between each of said first support members and associated base member.

10. The apparatus according to claim 1 additionally comprising locking means for selectively locking said movable supports against movement.

11. The apparatus according to claim 10 wherein said locking means comprises at least one clamp for clamping each of said movable supports.

12. The apparatus according to claim 10 wherein said at least one clamp comprises a caliper clamp.

13. The apparatus according to claim 1 additionally comprising a housing defining a housing interior for accommodating said automobile while the performance of said automobile is being tested and evaluated by said apparatus.

14. The apparatus according to claim 13 wherein said housing comprises a portable module accommodating said torque applicator means, said movable support means, and said force applicator means within the interior thereof.

15. The apparatus according to claim 13 additionally comprising means for modifying the atmospheric environment within said housing interior to simulate natural atmospheric conditions that may actually occur at the location of a road or track.

16. The apparatus according to claim 15 wherein said means for modifying the atmospheric environment within said housing interior includes air flow generating means for generating a flow of air along said automobile within said housing interior.

17. The apparatus according to claim 15 wherein said means for modifying the atmospheric environment within said housing interior includes means for changing the temperature of air within said housing interior.

18. The apparatus according to claim 15 wherein said means for modifying the atmospheric environment within said housing interior includes means for changing the moisture content of air within said housing interior.

19. The apparatus according to claim 15 wherein said means for modifying the atmospheric environment within said housing interior includes means for changing the pressure of air within said housing interior.

20. The apparatus according to claim 1 wherein said control means includes a control processing unit programmed for simulating conditions of at least one actual automobile race track.

21. The apparatus according to claim 1 additionally comprising visual display means for providing a constantly changing display of a road or race track as would be visually perceived by an individual actually driving said automobile on the road or race track.

22. The apparatus according to claim 1 wherein said force applicator means comprises frame attachment means for attachment to the frame of said automobile and prime mover means for moving said frame attachment means.

23. Apparatus for testing and evaluating the performance of an automobile including a frame and wheel shafts under simulated road or race track and environmental conditions with the automobile not being supported by tires, said apparatus comprising, in combination:

a plurality of torque applicators for attachment to wheel shafts of an automobile to support the automobile by said wheel shafts when attached thereto and independently apply torque forces to said wheel shafts;

movable support means supporting said torque applicators and independently movable in up and down directions during testing and evaluation of said automobile to simulate road or race track surface conditions;

force applicator means for connection to said automobile at a location spaced from said wheel shafts to apply forces to said automobile;

a portable housing defining a housing interior for accommodating said automobile during test and evaluation thereof;

environment modifying means for varying the atmospheric environment within said housing interior; and control means operatively associated with said torque applicators and said force applicator means for selectively varying the torque forces applied by said torque applicators to said wheel shafts and for varying the forces applied to said automobile at said location by said force applicator means, said control means further being operatively associated with said environment modifying means for changing the atmospheric environment within said housing interior to simulate natural atmospheric conditions that may actually occur at a road or race track.

* * * * *